March 8, 1932.　　　H. N. OTT　　　1,848,378

OPAQUE PROJECTION APPARATUS

Filed Nov. 6, 1929　　　2 Sheets-Sheet 1

INVENTOR.
Harvey N. Ott by Parker & Prochnow
ATTORNEYS.

March 8, 1932. H. N. OTT 1,848,378
OPAQUE PROJECTION APPARATUS
Filed Nov. 6, 1929    2 Sheets-Sheet 2

INVENTOR.
Harvey N. Ott
by Parker & Prochnow
ATTORNEYS.

Patented Mar. 8, 1932

1,848,378

UNITED STATES PATENT OFFICE

HARVEY N. OTT, OF BUFFALO, NEW YORK, ASSIGNOR TO SPENCER LENS COMPANY, OF BUFFALO, NEW YORK

OPAQUE PROJECTION APPARATUS

Application filed November 6, 1929. Serial No. 405,130.

This invention relates to improvements in apparatus for the projection of images of opaque objects.

It has been found that when projecting images of opaque objects such as text or illustrations from books, cards, or other sheets and similar matter, in a room which is partially illuminated, better results are obtained if the images are projected upon a translucent screen interposed between the projection apparatus and the observer. When this work is carried on at night for example, or in a room which is substantially dark, satisfactory results can be obtained by projecting the image upon the usual opaque white screen from whence the image is reflected back to the audience at the same side of the screen as the projection apparatus.

When images are projected under the first conditions the subject can be placed upside down in a vertical position or transversely across the axis of the projection lens, since an image of the subject so arranged is seen right side up and reads clearly from left to right when viewed through the translucent screen. However, in order to produce an image upon an opaque reflecting screen, the subject must be so arranged and the image forming rays therefrom erected at some point between the object and the projection lens in order to enable a proper image of the object to be produced; that is one which will be seen right side up and reading from left to right upon said screen. Heretofore these two sets of conditions have only been met by the provision of separate projection apparatus for each type of projection, which, in addition to the double cost of equipment, caused extra labor and waste of time to change from one to the other, and called for extra space for storage of the equipment.

An important object of the present invention is to provide an improved opaque projection apparatus with which images of opaque objects can be projected selectively either through a translucent screen or upon an opaque white or other reflecting screen or the like surface.

Other objects are to provide a projection apparatus of this sort which is constructed to permit it to be quickly changed from one type of projection to the other; also to provide apparatus of this sort in which opaque objects of the class described may be readily supported in two different positions so that an image of an object in one of these positions can be projected through a translucent screen, and an image of an object in the other position can be projected upon an opaque screen; and also to construct an apparatus for this purpose which is strong and compact and consists of relatively few parts not liable to readily get out of order.

Other objects will be apparent from the following disclosure of an embodiment of my invention and the appended claims.

Figure 4:
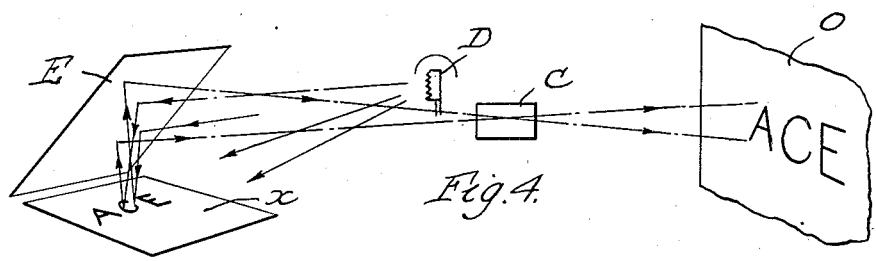
Fig. 4 is a diagrammatic illustration showing the projection of an image upon an opaque reflecting screen with the apparatus arranged as in Fig. 1.
Figure 5:
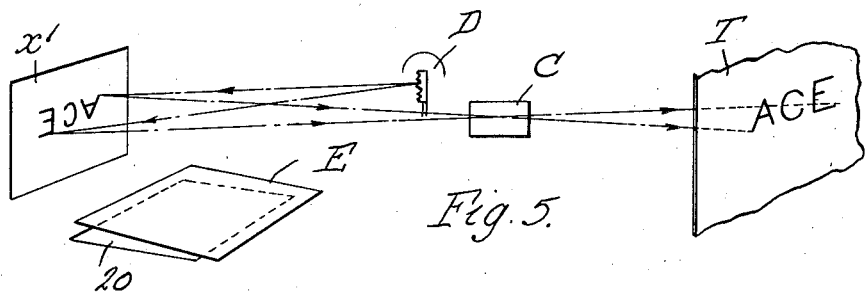
Fig. 5 is a diagrammatic view showing an image projected through a translucent screen, the apparatus being arranged as in Fig. 2.

For the purpose of illustration an opaque, white reflecting screen of well known form, or its equivalent, is represented at O in Fig. 4, upon which an image of an opaque object, such as an illustration or text matter from a book or sheet, or a card may be projected by my improved projection apparatus and seen by reflection from the same side as the apparatus, while a translucent screen T is indicated in Fig. 5, and upon which images of similar opaque objects are projected by the apparatus to be viewed at that side thereof which is remote from the apparatus.

In the illustrated embodiment the projection apparatus includes a rectangular casing or housing A having front and rear upright walls 10 and 11 respectively, opposite upright side walls 12, a bottom wall 13 of double or ventilated construction, and a top wall 14. The casing A is supported on a base B comprising a pair of upright standards 15 secured to the lower front corners of the casing and having extensions or feet 16 which project rearwardly beneath the casing in spaced relation thereto so as to permit access to the bottom of the casing from the rear of the apparatus. The free ends of the feet 16 may be rigidly connected by a cross brace 17.

A projection lens C is arranged in the front wall 10 of the casing with its axis arranged horizontally lengthwise of the casing. The casing is constructed so that opaque objects can be supported in two different positions relative to the axis of the projection lens C. In one position an object is supported in a horizontal position, or parallel with the lens axis, in or adjacent an opening 20 in the bottom wall 13 of the casing, and in the other position the object is supported in a vertical position, or crosswise of said lens axis, in or adjacent an opening 21 in the back wall 11 of the casing.

The apparatus is provided with suitable means for supporting the objects at the openings 20 and 21, as by the use of a movable object holder or platform which can be constructed and mounted so as to be moved away from the opening to mount the object thereon, and returned to the opening to support the object in operative relation thereto.

A separate platform or object holder could be provided for each opening, but preferably, as shown in the drawings, a single holder or platform 22 is provided which is adjustable from one position to the other. This platform is pivotally mounted, as by means of clips or bearings 23, upon a U-shaped bail 24, the legs 25 of which, in the position of the parts shown in Fig. 1, telescopically engage in a pair of sleeves or tubes 26 pivoted at 27 on the base B. When these parts are in telescopic relation the platform is held yieldingly against the opening 20 in the bottom wall 13 by a tension coil spring 28 connected to each sleeve 26 and to the casing A. In this manner the support or platform 22 can be readily reached from the rear of the casing and depressed to move it away from the opening 20 to enable an object $x$ to be placed on or removed therefrom.

Figures 1, 2:
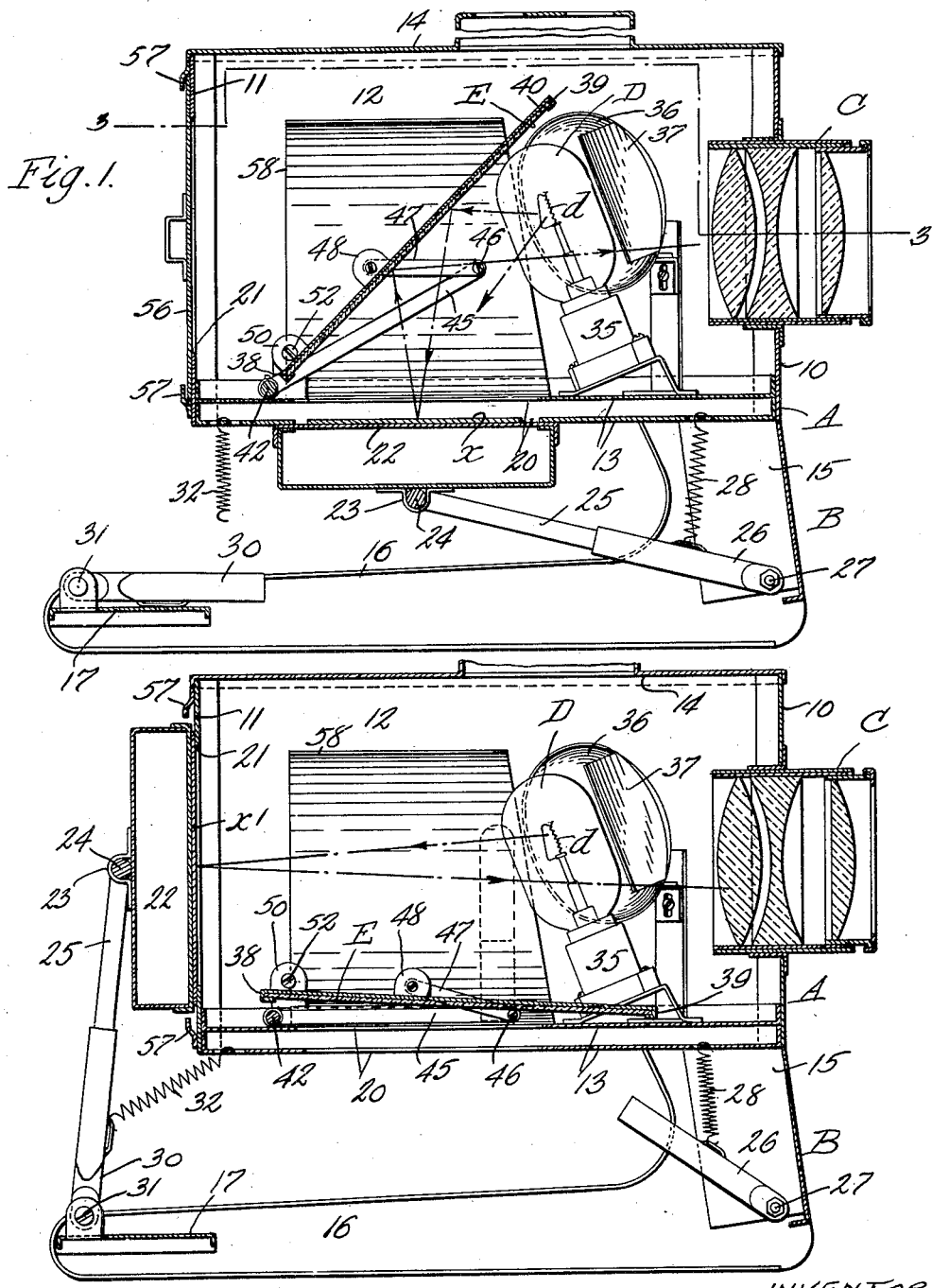
Fig. 1 is a longitudinal sectional elevation of an embodiment of my improved apparatus for the projection of images of opaque objects, showing the same arranged for the projection of an image of an opaque object upon an opaque or reflecting screen.
Fig. 2 is a similar view showing the apparatus arranged for the projection of images of opaque objects through a translucent screen.

When it is desired to mount an object $x^1$ in or adjacent the upright opening 21, the platform is removed from its position over the opening 20 as shown in Fig. 1 by disengaging its supporting legs 25 from the sleeves 26 and engaging them in a second pair of sleeves 30, the ends of which are pivoted at 31 on the cross brace or bridge 17. The platform is yieldingly held in position for supporting the object $x^1$ in operative relation to the opening 21 by tension coil springs 32 secured to the sleeves 30 and to the casing A. Any other suitable means may be provided for supporting objects in operative relation to the openings 20 and 21.

In the use of the present projection apparatus, when projecting images upon an opaque screen O, such as indicated in Fig. 4, to be viewed from the same side of the screen as the apparatus itself, the objects are placed flatwise at the lower opening 20, the image forming rays being erected by suitable means disposed between the object and the lens C. On the other hand, when projecting an image upon the translucent screen T to be viewed from a position at the opposite side thereof to that upon which the apparatus is located, the opaque object is arranged in upright position or on edge at the other opening 21. In this case the image forming rays pass directly from the object into the lens, and are projected thereby upon and through said screen as an image which is right side up and reads properly from left to right when viewed in the manner stated. This image when seen from the opposite side however, while being right side up is reversed as regards left and right.

It is preferable that the same source or sources of light be used to illuminate objects at the opening 20 or 21. The illuminating means may be of any suitable sort, such as a pair of incandescent lamps D, one of which is mounted at each side of the longitudinal center of the casing between the lens C and the openings 20 and 21 at which the objects are arranged. These lamps are mounted in suitable bases 35 secured on the bottom wall 13 of the casing, and in order to concentrate the light from the filament $d$ of each lamp towards the objects, suitable reflectors 36 of concave or condensing type are arranged so as to direct light rays towards the objects. These reflectors may have baffles or shields 37 to prevent light from passing directly from the lamps D into the lens C.

In order to effectively direct light rays from the lamps D upon an object arranged upon the support 22 at the opening 20, an inclined reflector E is interposed between said lamps and said object in position to reflect rays upon the latter, in addition to the light reaching the object directly. The reflector is arranged with its lower edge 38 below the lower edge of the opening 21, and inclines upwardly therefrom preferably at an angle of 45°, its top edge 39 being disposed adjacent the upper ends of the lamps D. The mirror is provided with a suitable frame 40.

By this arrangement light rays from the lamps D not only directly illuminate an object in the position stated, but also indirectly by rays passing first to the mirror E and thence downwardly upon the object. The image forming rays from the object passes therefrom upwardly back to the mirror E and thence forwardly along the optical axis through the projection lens C, as indicated by the arrows in Fig. 1.

The illuminating means and the reflector E are arranged substantially as disclosed in my co-pending application for the Letters Patent Ser. No. 388,305 filed by me August 26, 1929, but any other suitable means may be provided for this purpose.

While thus illuminating an object disposed at the opening 20, the mirror or reflector E is so positioned as to act as a shield to prevent most of the light rays from the lamps D from reaching the opening 21 at the back of the casing.

In order to permit the light rays from the lamps D to reach and directly illuminate an object at the opening 21, and at the same time shield or close the opening 20 from the light rays, the mirror or reflector E is movably mounted or adjusted by means such that it can be shifted from the position shown in Fig. 1 to that shown in Fig. 2, wherein it lies across the opening 20 substantially parallel with the bottom wall 13.

It is desirable when the reflector is in the inclined position shown in Fig. 1 that the same be arranged as close as possible to the source of light D, and in order to prevent the upper edge 39 of the reflector from striking or interfering with the lamps D in the movements of the reflector, the reflector mounting or adjusting means is so constructed that, when moving to its lowered position the reflector is also permitted a limited rearward movement.

Figure 3:
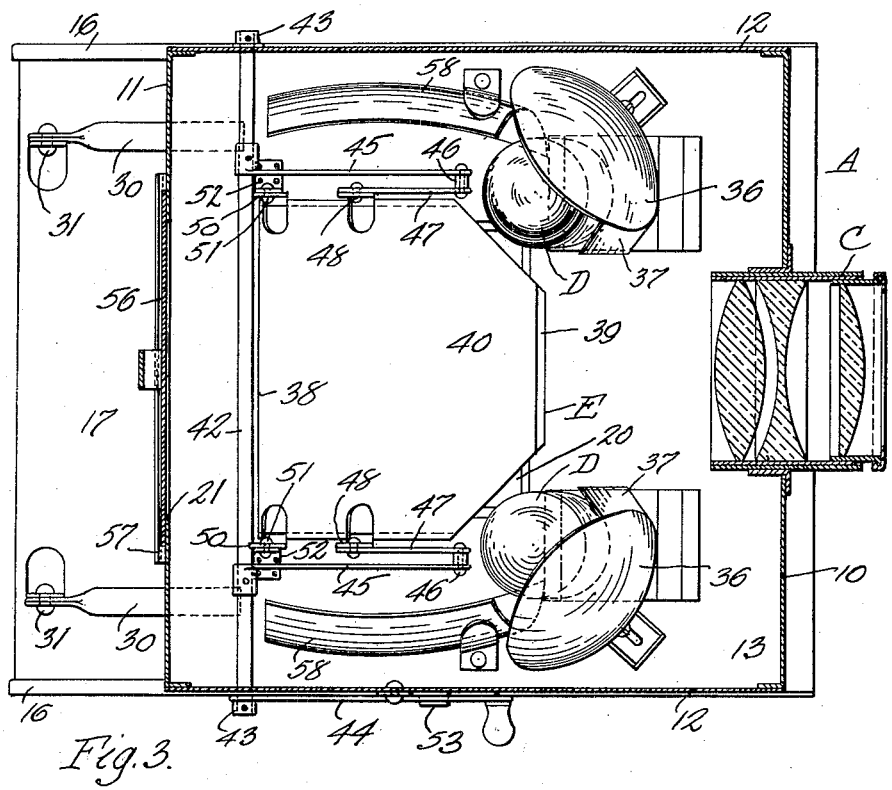
Fig. 3 is a horizontal section thereof on line 3—3 of Fig. 1.

Any suitable means may be provided for supporting and adjusting the reflector E in the manner described. The means shown in the drawings for this purpose, comprise a rock shaft 42 which extends horizontally across the casing adjacent the bottom wall 13 and below the bottom edge of the rear opening 21. The shaft 42 is journaled in bearings 43 in the side walls 12 of the casing and is provided outside of the casing with an operating lever or handle 44. Within the casing the rock shaft 42 is provided with a pair of forwardly extending fixed rock arms 45 one of which is disposed adjacent each side edge of the reflector E and has its free end connected by a pivot 46 to one end of a link 47. The other end of the link 47 is pivoted to a lug or extension 48 formed on the mirror frame 40, near said adjacent side edge and intermediate the top and bottom edges of the reflector. These pivots 48 are preferably disposed rearwardly of the free end of the rock arm 45 as shown in Figs. 1 to 3. The frame 40 is further provided adjacent to and forwardly of the lower edge 38 of the reflector with a second pair of upwardly projecting lugs 50 each of which is connected by a pivot 51 to a stationary lug or bracket 52 secured to and projecting upwardly from the bottom wall 13 of the casing.

This construction provides a floating support for the reflector E. To hold the latter in its inclined position a hook or the like 53, pivoted on one of the side walls 12 of the casing is provided, and with which the operating lever 44 can be releasably connected. By disengaging the lever 44 from this hook 53 the reflector may be swung about its pivots 52 to the lower position shown in Fig. 2. Since the pivots 52 are disposed forwardly of the rear edge 39 of the reflector, the latter will, in said downward movement also move rearwardly about the pivots 52 and across the rock shaft 42, thus permitting the upper edge 39 of the reflector to clear the lamps D as it descends.

After the reflector E has been lowered an object at the opening 21 can be illuminated directly by the lamps D and the image forming rays will pass directly from the object along the optical axis to the projection lens C. The reflector E at the same time effectually shields the opening 20 at the bottom of the casing.

If desired, a door or slide 56 can be provided for closing the opening 21 when the platform 22 is at the lower opening 20. The slide 56 can be mounted in suitable guides 57 to permit lateral movement or disengagement thereof when it is desired to support an opaque object at the opening 21.

If desired, suitable upright curved reflectors 58 may be arranged within the casing at opposite sides of the reflector E in a position to receive and reflect light rays from the lamps D to an object arranged at the opening 20 or at the opening 21.

By referring to Fig. 4 it will be seen that by arranging an object $x$, having printing thereon for example, at the opening 20 and adjusting the reflector E to its inclined position, the object will be illuminated directly and also indirectly in the manner explained. The image forming rays therefrom will pass to the reflector E, thence to the lens C and will be projected thereby right side up and reading correctly from left to right on the opaque, reflecting screen O as seen from the side upon which the image is projected.

If now it be desired to use the apparatus in connection with a translucent screen T, it is only necessary to transpose the object holder or platform 22 from the opening 20 to the opening 21, disengaging the legs 25 from the sleeves 26 and engaging them in the other sleeves 30. The reflector E is now shifted to its lower position to expose the opening 21 to the lamps D and lens C. With the apparatus thus arranged, an object may be disposed in the opening 21 in the manner shown in Fig. 5, whereupon its image may be projected upon the screen T so that when viewed from its opposite or remote side it will appear in proper position, as shown.

The opaque projection apparatus described is of relative simple, compact and rugged construction, and by its use one is enabled to quickly change it to project images of opaque objects upon one or the other kind of screen as occasion may require.

I claim:

1. Apparatus for the projection of images of opaque objects including a substantially light-tight casing having a pair of openings disposed in angular relation and one of which extends crosswise of the axis of a projection lens mounted in said casing and the other of which extends lengthwise and at one side of said axis, means for supporting an object at either opening, a source of light within said casing, and a reflector also arranged in said casing and which, in one position, extends crosswise of said axis between said light source and an object at said first opening and prevents light rays from reaching said object while permitting light rays to reach an object at said second opening, and which also intercepts and directs image forming rays to said lens from said second object, and said reflector being movable to another position in which it extends substantially lengthwise of and at one side of said axis and permits light rays to reach said first object and pass therefrom to said lens, and at the same time also prevents light rays from said source of light from reaching said second object.

2. Apparatus for the projection of images of opaque objects including a projection lens, a source of light for illuminating the object, a support movable to a position for supporting an object opposite said lens so that image forming rays from said object pass directly along the optical axis of and to said lens, and said support being movable to another position at one side of said lens axis and wherein image forming rays from said object pass crosswise of said axis, and means adjustable into a position across said optical axis for intercepting and diverting such rays to said lens, and removable from its position across said axis when projection of image from object at one side of optical axis is not desired.

3. Apparatus for the projection of images of opaque objects, including a substantially light-tight casing having a movable support for supporting objects in either of two different positions, a source of light in said casing, a projection lens for receiving and projecting image forming rays from an object in either position, and reflecting means located within said casing and selectively operable from the outside thereof into and out of a location across the optical axis of said lens for permitting rays from said light source to illuminate an object in one of said positions while preventing said rays from reaching an object in the other position, or for permitting rays from said light source to illuminate an object in said second position while preventing said rays from reaching an object in said first position.

4. Apparatus for the projection of images of opaque objects, including a substantially light-tight casing having a movable support for supporting objects in either of two different positions, a source of light in said casing, a projection lens for receiving and projecting image forming rays from an object in either position, and an adjustable reflector in said casing which is movable to a position wherein it receives and reflects light rays from said light source upon an object in one of said positions and intercepts image forming rays passing therefrom and reflects them to said lens for projection thereby, and also prevents said light rays from reaching an object in said other position, said reflector being also movable to a second position in which it permits said light rays to pass to said second object and image forming rays therefrom to pass to said lens for projection thereby, and in which position said reflector prevents said light rays from reaching an object in said first position, and means at the outside of said casing and connected therethrough with said reflector for operating the latter.

5. Apparatus for the projection of images of opaque objects, including a substantially light-tight casing having a movable support for supporting objects in either of two different positions, a source of light in said casing, a projection lens for receiving and projecting image forming rays from an object in either position, an adjustable reflector in said casing adapted to occupy an inclined position in which its upper edge is close to and extends over said light source and wherein it receives and reflects light rays therefrom upon and intercepts and reflects image forming rays to said lens from an object in one of said positions, and said reflector being movable to a substantially horizontal position wherein it permits said light rays to pass to said second object and image forming rays therefrom to pass to said lens and also prevents said light rays from reaching an object in said first position, and a support for said reflector including a stationary pivot the axis of which is disposed inwardly of and above said lower edge of said reflector when the latter is inclined, a rock shaft extending parallel with and below and in rear of said lower edge of said reflector, a rock arm projecting therefrom and connected to one end of a link, the other end of which is pivoted to said mirror intermediate its upper and lower edges, and means outside said casing for turning said rock shaft, whereby as said reflector is shifted to its other position its lower edge will swing about said stationary pivot and across said rock shaft so as to permit its upper edge to clear said light source in its descent.

6. Apparatus for the projection of images of opaque objects, comprising an approximately light-tight enclosure, a projection lens in one wall of the enclosure for projecting images therefrom, means for mounting an opaque object, whose image is to be projected, across the optical axis of said lens at a distance from said lens, means for also mounting an object at one side of and approximately parallel to said optical axis, and between said first mounting means and said lens, a source of light in said enclosure for illuminating objects held by either of said mounting means, a reflector disposed obliquely across said optical axis between said first mounting means and said second mounting means for reflecting light rays from an object held by said second mounting means along said optical axis and through said lens, and means mounting said reflector for movement out of the optical axis of said lens when projection of light rays from an object held by said first mounting means is desired.

7. Apparatus for the projection of images of opaque objects, comprising an approximately light-tight enclosure, a projection lens in one wall of the enclosure for projecting images therefrom, means for mounting an opaque object, whose image is to be projected, across the optical axis of said lens at a distance from said lens, means for also mounting an object at one side of and approximately parallel to said optical axis, and between said first mounting means and said lens, a source of light in said enclosure for illuminating objects held by either of said mounting means, a reflector disposed obliquely across said optical axis between said first mounting means and said second mounting means for reflecting light rays from an object held by said second mounting means along said optical axis and through said lens, and means mounting said reflector for movement out of said position across the optical axis into a position across an object held by said second mounting means when projection of an image of an object held by said first mounting means is desired.

8. Apparatus for the projection of images of opaque objects, comprising an approximately light-tight enclosure, a projection lens in one wall of the enclosure for projecting images therethrough, said enclosure having an object mounting window opposite said lens, and a second object mounting window at one side of the optical axis of said lens and between said lens and said first window, a source of light in said enclosure for illuminating an object at each window, whereby said lens will project images by the transmission of light rays from each of said windows, a reflector disposed obliquely across the optical axis of said lens and between said first mentioned window and said second window, and facing said second mentioned window and said lens, so as to reflect light rays from said second window along the optical axis of said lens and toward said lens, and intercepting light rays traveling toward said lens from said first mentioned window, and means mounting said reflector for movement out of the path of light rays proceeding from said first mentioned window and passing through said lens, whereby, by the movement of said reflector, images from either of said windows may be projected by said lens.

9. Apparatus for the projection of images of opaque objects, comprising an approximately light-tight enclosure, a projection lens in one wall of the enclosure for projecting images therethrough, said enclosure having an object mounting window at the opposite side of said enclosure from said lens, and a second and similar window in another wall of the enclosure between said first window and said lens and at one side of the optical axis of the lens, an object mounting device formed to fit each of said windows, a pair of pivotal arms attached to different parts of said enclosure at the exterior thereof, and having means for detachably mounting said object mounting means, and shifting it toward and from one of said windows upon pivotal movement of the arm to which it is attached, a spring connected to each arm for shifting it in a direction to carry said object mounting means toward a window, whereby said object mounting means may be utilized with either window, and changed to the other window at will by detaching it from arm and attaching it to the other arm, a closure for the window not in use at any time, and a reflector disposed before said second mentioned window for reflecting light rays therefrom along said optical axis and through said lens, said reflector being mounted for movement from reflecting position into a position to cover said second window and out of the path of light rays from said first window to said lens, whenever said second window is not in use.

HARVEY N. OTT.